United States Patent
Pforte et al.

(10) Patent No.: US 9,815,241 B2
(45) Date of Patent: Nov. 14, 2017

(54) METHOD OF 3D PRINTING PLASTIC MOLDING COMPOUND ON FOIL PLY

(71) Applicant: LEONHARD KURZ Stiftung & Co. KG, Furth (DE)

(72) Inventors: Klaus Pforte, Oberasbach (DE); Martin Hahn, Herrieden (DE)

(73) Assignee: LEONHARD KURZ STIFTUNG & CO. KG, Furth (DE)

( * ) Notice: Subject to any disclaimer, the term of this patent is extended or adjusted under 35 U.S.C. 154(b) by 108 days.

(21) Appl. No.: 14/667,098

(22) Filed: Mar. 24, 2015

(65) Prior Publication Data
US 2015/0273757 A1 Oct. 1, 2015

(30) Foreign Application Priority Data
Mar. 27, 2014 (DE) .................. 10 2014 104 321

(51) Int. Cl.
| | |
|---|---|
| *B29C 65/48* | (2006.01) |
| *B05D 1/02* | (2006.01) |
| *B05D 3/00* | (2006.01) |
| *B05D 7/14* | (2006.01) |
| *B05D 1/26* | (2006.01) |
| *B29C 37/00* | (2006.01) |
| *B29C 65/00* | (2006.01) |
| *B32B 9/04* | (2006.01) |
| *B32B 15/10* | (2006.01) |
| *B32B 7/12* | (2006.01) |
| *B32B 15/082* | (2006.01) |
| *B32B 15/04* | (2006.01) |

(Continued)

(52) U.S. Cl.
CPC ................ *B29C 65/48* (2013.01); *B05D 1/02* (2013.01); *B05D 1/26* (2013.01); *B05D 3/002* (2013.01); *B05D 7/14* (2013.01); *B29C 37/0025* (2013.01); *B29C 65/4815* (2013.01); *B29C 66/02* (2013.01); *B29C 66/41* (2013.01); *B29C 66/70* (2013.01); *B29C 66/712* (2013.01); *B29C 66/7232* (2013.01); *B29C 66/72327* (2013.01); *B29C 66/742* (2013.01); *B29C 66/7484* (2013.01); *B29C 66/7487* (2013.01); *B29C 67/0055* (2013.01); *B29C 67/0059* (2013.01); *B29C 67/0092* (2013.01); *B32B 7/12* (2013.01); *B32B 9/041* (2013.01); *B32B 9/042* (2013.01); *B32B 9/045* (2013.01); *B32B 15/00* (2013.01); *B32B 15/04* (2013.01); *B32B 15/08* (2013.01); *B32B 15/082* (2013.01); *B32B 15/085* (2013.01); *B32B 15/10* (2013.01); *B33Y 10/00* (2014.12); *B33Y 30/00* (2014.12); *B33Y 40/00* (2014.12); *B33Y 99/00* (2014.12); *B44C 3/02* (2013.01); *B05D 2201/02* (2013.01); *B05D 2202/00* (2013.01); *B05D 2203/20* (2013.01); *B05D 2203/24* (2013.01); *B05D 2502/005* (2013.01); *B05D 2507/005* (2013.01); *B29C 2795/00* (2013.01); *B32B 2255/06* (2013.01); *B32B 2255/08* (2013.01); *B32B 2255/10* (2013.01); *B32B 2255/26* (2013.01); *B32B 2255/28* (2013.01); *B33Y 80/00* (2014.12); *Y10T 428/24612* (2015.01); *Y10T 428/24802* (2015.01); *Y10T 428/24901* (2015.01); *Y10T 428/264* (2015.01); *Y10T 428/31507* (2015.04); *Y10T 428/31696* (2015.04); *Y10T 428/31895* (2015.04); *Y10T 428/31931* (2015.04); *Y10T 442/20* (2015.04)

(58) Field of Classification Search
CPC . B05D 1/02; B05D 1/26; B05D 3/002; B05D 7/14; B05D 2201/02; B05D 2202/00; B05D 2203/20; B05D 2203/24; B05D 2502/005; B05D 2507/005; B29C 37/0025; B29C 65/48; B29C 65/4815; B29C 66/02; B29C 66/41; B29C 66/70; B29C 66/712; B29C 66/7232; B29C 66/7231; B29C 66/72327; B29C 66/72329; B29C 66/742; B29C 66/7484; B29C 66/7487; B29C 2795/00; B32B 7/12; B32B 9/041; B32B 9/042; B32B 9/045; B32B 15/00; B32B 15/04; B32B 15/08; B32B 15/082; B32B 15/085; B32B 15/10; B32B 2255/06; B32B 2255/08; B32B 2255/10; B32B 2255/26; B32B 2255/28; B33Y 10/00; B33Y 80/00; B33Y 99/00; B44C 3/02
USPC ........................................................ 427/258
See application file for complete search history.

(56) References Cited

U.S. PATENT DOCUMENTS

| | | | | |
|---|---|---|---|---|
| 4,777,077 A | * | 10/1988 | Miyazawa | ............... B32B 27/08 264/299 |
| 5,939,008 A | * | 8/1999 | Comb | .................. B29C 67/0062 264/308 |

(Continued)

FOREIGN PATENT DOCUMENTS

| | | |
|---|---|---|
| DE | 102007047326 | 4/2009 |
| EP | 2 189 272 A2 * | 5/2010 |

(Continued)

OTHER PUBLICATIONS

English language machine translation of the description of EP 2 189 272 A2, retrieved Dec. 26, 2016, 33 pages.*

(Continued)

*Primary Examiner* — William Phillip Fletcher, III
(74) *Attorney, Agent, or Firm* — Hoffmann & Baron, LLP (57) ABSTRACT

A method for producing a molded body having the following steps: a) providing a foil ply; b) applying a plastic molding compound in a predefined three-dimensional shape onto the foil ply by means of a three-dimensional printing method.

25 Claims, 5 Drawing Sheets

(51) Int. Cl.
*B32B 15/00* (2006.01)
*B32B 15/085* (2006.01)
*B32B 15/08* (2006.01)
*B33Y 99/00* (2015.01)
*B44C 3/02* (2006.01)
*B29C 67/00* (2017.01)
*B33Y 10/00* (2015.01)
*B33Y 30/00* (2015.01)
*B33Y 40/00* (2015.01)
*B33Y 80/00* (2015.01)

(56) References Cited

U.S. PATENT DOCUMENTS

| | | | |
|---|---|---|---|
| 6,022,207 A | 2/2000 | Dahlin et al. | |
| 2002/9985054 | 7/2002 | Tokie | |
| 2012/0046779 A1* | 2/2012 | Pax | B29C 67/0055 700/112 |
| 2015/0094837 A1* | 4/2015 | Cohen | B29C 67/0074 700/98 |
| 2016/0244980 A1* | 8/2016 | Urban | B44C 1/26 |
| 2016/0325487 A1* | 11/2016 | Miller | B29C 47/0002 |

FOREIGN PATENT DOCUMENTS

| | | |
|---|---|---|
| EP | 2189272 | 5/2010 |
| GB | 2330331 | 4/1999 |
| GB | 2 502 295 A * | 11/2013 |
| WO | WO 99/37457 | 7/1999 |
| WO | WO 2015/044046 A1 * | 4/2015 |

OTHER PUBLICATIONS

Matsumae et al., "Development of Digital Quasi-embossing Technology with an Inkjet Printer," NIP & Digital Fabrication Conference, 2012 International Conference on Digital Printing Technologies, pp. 24-27.*

* cited by examiner

METHOD OF 3D PRINTING PLASTIC MOLDING COMPOUND ON FOIL PLY

This application claims priority based on German Application No. DE102014104321.9, filed on Mar. 27, 2014.

BACKGROUND OF THE INVENTION

The invention relates to a method for producing a molded body and also a molded body produced in this manner.

To combine decorative or functional elements with plastic parts, accommodating foil plies with such elements in injection molded parts is known. In this case, such a foil ply is laid in an injection mold and fixed therein. Subsequently, a plastic molding compound is injected into the injection mold, where it bonds to the foil ply and cures. A known method for this purpose is the so-called in-mold decoration method (IMD) or the insert molding method.

However, such production methods are limited in multiple aspects. Because of the high temperatures and the high pressures during the injection molding, firstly the selection of the usable foil plies is restricted. In particular foils having sensitive electronic functional layers or security elements cannot be used, since they would be destroyed under the injection molding conditions.

Furthermore, the freedom of design is restricted in the case of injection molding, since essentially only a substantially homogeneous plastic molding compound can be used. The resulting molded body is thus also homogeneous except for the foil ply.

Furthermore, molds, which are complex to produce and operate, are required as a tool for injection molding. This requires high levels of investment and makes changes or individualizations of the parts to be produced problematic. Furthermore, the molds must be replaced regularly, since a high level of wear is present due to the above-mentioned high pressures and temperatures.

The object of the present invention is thus to specify a particularly simple and flexible method for producing a molded body and a molded body producible in this manner.

Summary of the Invention

This object is achieved according to the invention by the subject matter of claim 1 and claim 24.

Such a method for producing a molded body comprises the following steps:
a) providing a foil ply;
b) applying a plastic molding compound in a predefined three-dimensional shape onto the foil ply by means of a three-dimensional printing method.

A molded body which is thus obtainable therefore comprises a foil ply and a plastic molding compound, which is applied onto the foil ply in a predefined three-dimensional shape by means of a three-dimensional printing method.

Therefore, the foil ply forms a surface coating of the lower side of the molded body. The lower side of the molded body, which is defined during the production of the molded body, can also be the upper side or the lateral surface of the molded body in the later use thereof.

Three-dimensional printing methods are typically performed using thermoplastic plastic material, which is melted and is printed in the liquid state drop-by-drop by means of heated nozzles to form a layer. Arbitrary three-dimensional structures can be molded by the successive application of such layers.

In this case, the plastic is heated only slightly above its melting temperature, so that the plastic solidifies immediately after it is incident on the respective substrate and in particular cannot run. Thus, a high printing resolution can be achieved, which is defined above all by the construction of the nozzles. In this manner, the printed plastic drops bond to the foil ply lying underneath to form a unit.

Since the plastic molding compound is successively applied in small quantities, only minimal heating beyond the melting point of the plastic is necessary. In addition, the application of the plastic molding compound is performed in an unpressurized manner. The heat introduction into the foil ply is therefore very slight, so that foil plies having sensitive decorative or functional elements can also be used, which would not survive the pressure and/or temperature conditions during injection molding.

The drop-by-drop or layer-by-layer application of the plastic molding compound additionally opens up significantly expanded design possibilities for the molded body in relation to injection molding. Thus, for example, the properties of the plastic molding compound, for example, the color or the conductivity of the plastic molding compound, can be varied over the volume of the molded body, for example, to provide further decorative or functional structures inside the molded body.

Since the free construction of arbitrarily designed molded bodies is possible by means of three-dimensional printing methods, in addition, a mold is not required as a tool, as would be the case with injection molding. It is thus possible to perform changes in the design of the molded body or to produce individualized molded bodies without further expenditure of costs or time.

The foil ply, which can be single-layer or multilayered, thus forms a decorative surface of the molded body. Because of the drop-by-drop or layer-by-layer application of the plastic molding compound in three-dimensional printing, fine gradations result on the surface of the molded body. The foil ply can compensate for these gradations, so that a high quality, smooth surface results.

It is advantageous in particular in this case if a foil ply is used, which has an adhesion-promoter layer, onto which the plastic molding compound is applied in step b). In this way, particularly secure adhesion between the foil ply and the plastic molding compound is ensured.

A foil ply is expediently used, the adhesion-promoter layer of which consists of the same plastic material as the plastic molding compound applied in step b). The plastic molding compound applied during the three-dimensional printing can melt the adhesion-promoter layer and securely bond thereto. The adhesion-promoter layer thus provides the same properties in this case as a ply of the molded body which was previously printed using the plastic molding compound, so that the ply of the molded body printed thereafter can fuse with the adhesion-promoter layer, precisely as with a previously printed ply of the molded body, to form a unit.

It is not absolutely necessary in this case to use the exact same plastic for the adhesion-promoter layer as for the plastic molding compound. It is essential that the plastics can bond well. Thus, plastics made of related material classes or plastics having similar polarities can also be used.

Alternatively, a foil ply can also be used, the adhesion-promoter layer of which has a heat-activatable adhesive. Since the plastic molding compound is applied in the hot state during the printing, the adhesive is activated in a punctiform manner upon the incidence of a plastic drop and bonds this drop securely to the foil ply.

Suitable adhesives for plastic molding compounds made of acrylonitrile-butadiene-styrene copolymer (ABS) or polycarbonate (PC) or ABS-PC are, for example, adhesives based on polyvinyl chloride (PVC) or based on acrylics or adhesives based on mixtures of PVC and acrylics.

The adhesion-promoter layer advantageously has a layer thickness of 0.01 µm to 50 µm, preferably 5 µm to 50 µm. Therefore, the irregularities resulting from the three-dimensional printing can be compensated for particularly well.

It is furthermore advantageous if a transfer foil, in particular a hot stamping foil, which has a transfer ply and a carrier layer detachable therefrom, is used as the foil ply, wherein the plastic molding compound is applied in step b) to the transfer ply.

The carrier layer stabilizes the transfer ply in this case, so that it can also comprise sensitive layers, which are not self-supporting, and which could not be used without damage without a carrier layer. Furthermore, the carrier layer protects the surface of the transfer ply from damage during the production process.

The carrier layer preferably consists of polyethylene terephthalate (PET), PC, or ABS, and has a layer thickness of 5 µm to 250 µm, preferably of 10 µm to 100 µm.

Alternatively, a lamination foil can also be used as the foil ply. This is expedient in particular if the foil is self-supporting and does not have a sensitive surface.

Such lamination foils preferably have a total thickness of 10 µm to 500 µm.

A foil ply which has at least one decorative layer is preferably used. A decorative layer is to be understood in this case to include layers which provide a visually appealing effect and/or items of optical information, in particular by means of contrast between a color and/or a reflection capability and/or an absorption capability of the decorative layer.

Furthermore, a foil ply is preferably used, the at least one decorative layer of which is or comprises one of the following layers or a combination thereof: a layer having at least one colorant and/or pigment, a pigment excitable in the visible and/or infrared or ultraviolet spectral range to fluorescence and/or luminescence, an optically variable pigment, a liquid crystal layer, a cholesterol liquid crystal layer, a metal layer, a layer having a relief structure, in particular a diffractive lattice structure, a hologram, a matte structure, a layer having a microoptical structure, in particular a microlens and/or microprism arrangement, a layer made of a textile material, a leather, an artificial leather, or a wood veneer. Optically variable means in this context that the optical appearance changes depending on the observation angle and/or illumination angle.

Manifold decorative effects may be achieved by such layers or structures. Furthermore, security elements, for example, security holograms, can thus be integrated into the decorative layer, which can be used, for example, for authenticating the molded body and protecting it from counterfeiting.

Furthermore, items of individualization or personalization information can be applied to the foil ply. This can be performed before the three-dimensional printing operation in a separate work step. For example, the respective information can be applied to the foil ply by thermal transfer printing, inkjet printing, by laser ablation, or by laser treatment of a colorant layer, which displays a permanent color change upon interaction with the laser light.

It is furthermore preferable if a foil ply is used, which has at least one functional layer. Functional layers are to be understood in this case as layers which provide the foil ply with additional properties, for example, protection from mechanical influences or additional functionalities, for example, as can be achieved by the integration of electronic components.

The at least one functional layer preferably has a protective layer for protection from mechanically and/or thermally and/or chemically external influences and/or a magnetic and/or magnetizable layer.

Therefore, on the one hand, further, sensitive layers of the foil ply can be protected from harmful influences, so that the molded body has particularly good durability. The molded body can additionally be used as a data memory by way of the integration of magnetic or magnetizable layers. Therefore, for example, items of individualization information can be stored or security or authentication codes can be provided, for example, by means of a magnetic strip.

Furthermore, it is advantageous if the at least one functional layer is or comprises an electrical or electronic layer, in particular a layer comprising conductor track structures, antenna structures, electrical or electronic components, sensors, inductive or capacitive touch sensors, chips, display elements, in particular LED or OLED or LCD display elements.

In this manner, further functions and authentication options can be integrated into the molded body, which improves its possible applications and its counterfeiting security.

It is advantageous in this case if the plastic molding compound is applied so that it only partially covers the at least one functional layer.

Therefore, for example, exposed conductor track structures can be provided on the molded body, which can be used for contacting electrical or electronic elements of the functional layer, so that the molded body can interact with external devices.

Furthermore, a foil ply having a functional layer is preferably used, which comprises a tactilely perceptible surface relief, in particular having a predefined roughness and/or having a predefined item of tactilely perceptible information, preferably in Braille script. The tactilely perceptible surface relief can also be embodied in particular so that a special material impression is generated, which otherwise cannot be provided by the plastic molding compound. For example, this can be a velvety, so-called soft touch impression of the surface.

In this way, additional items of information and security elements can be integrated into the molded body and its usability can be improved for visually impaired users.

Preferably, after the application of the plastic molding compound in step b), a further plastic molding compound is applied in a predefined three-dimensional shape to the side of the foil ply facing away from the plastic molding compound applied in step b) by means of a three-dimensional printing method.

In other words, the foil ply is thus enclosed between the two plastic molding compounds and therefore lies in the interior of the resulting molded body. The foil ply is therefore protected particularly well from environmental influences and attempts at manipulation. The foil ply preferably has an adhesion-promoter layer on both sides for this purpose, made of a heat-activatable adhesive, as has already been described here by way of example.

The plastic molding compound is preferably applied in this case by means of a 3D print head, which is guided robotically in particular.

This also enables complex geometries of the molded body to be implemented. In particular the use of a robot arm provides more degrees of freedom than a conventional 3D printer. It is therefore possible, for example, to also apply the plastic molding compound to curved surfaces. The robot arm carries and guides the print head of the 3D printer in this case and can follow the contour of the curved surface in this case, in particular in all three spatial directions X, Y, Z.

The plastic molding compound is advantageously applied in the form of drops and/or strands and/or threads. This opens up a particularly large amount of design freedom in the shaping of the molded body.

A thermoplastic plastic, in particular ABS, polycarbonate, or ABS-PC is preferably used as the plastic molding compound. These plastics may be processed particularly well in three-dimensional printing methods and have melting points which enable the application to a foil ply, without damaging it.

The foil ply is preferably fixed on a support element having a predefined surface geometry, in particular by means of mechanical clamping means and/or by vacuum fixation, before the application of the plastic molding compound.

It is therefore ensured that the foil ply cannot shift during the printing operation. The surface geometry of the support element does not have to be planar in this case, but rather can also comprise curved surfaces, so that the molded body also receives a correspondingly curved surface.

In particular, the support element can comprise convex and/or concave surface sections. In general, arbitrary freeform surfaces are also implementable. The foil ply can optionally also be formed accordingly before the printing operation and the laying on the support element.

It is advantageous in this case if the support element consists of a dust-free material polished to a high gloss, for example, stainless steel, so that damage and soiling of the foil ply are avoided.

Preferably, before the application of the plastic molding compound, the foil ply is heated to a temperature, in particular to assist the wrinkle-free clinging of the foil ply to the surface located underneath upon application of the foil ply to a curved surface, and in particular also to assist the fusing of the plastic molding compound with the thermoplastic adhesion-promoter layer, which is thus heated above room temperature. The foil ply can be heated, for example, to a temperature of approximately 30° C. to approximately 150° C., preferably to a temperature of approximately 60° C. to approximately 100° C.

This improves the bonding of the printed plastic molding compound to the foil ply, so that later it may no longer be detached from the plastic molding compound. A heating device required for this purpose can be integrated, for example, in the support element and/or in the print head of the 3D printer.

Furthermore, it is advantageous if, during the application of the plastic molding compound, a plurality of plastics having different optical properties is applied, wherein the 3D print head is guided so that in particular an item of visually perceptible information is represented by the plastics.

The plastics can differ in this case, for example, in their coloration, their index of refraction, or their transparency.

In this manner, further design and/or security elements can be integrated in the molded body, which can be independent of the foil ply or can complement it to form an overall design. It is advantageous in this case if at least one of the plastics is transparent.

The item of visually perceptible information thus created in the molded body does not have to be planar in this case. By way of the three-dimensional printing it is possible that the information also extends in three dimensions. This significantly increases the counterfeiting security of the molded body.

It is furthermore advantageous if the visually perceptible information is or comprises at least one alphanumeric character, a symbol, a logo, a geometrical pattern, in particular a guilloche pattern, a pixel image, and/or an item of personalization information.

Multiple patterns which complement one another are also possible. Thus, for example, interference effects and the like can be generated.

At least one of the different-colored plastics preferably comprises a colorant, a pigment, nanoparticles, an optically variable pigment, a thermochromic or photochromic substance, to thus generate the desired color effect.

One of the different-colored plastics preferably comprises in this case a colorant or a pigment which is detectable in the ultraviolet and/or visible and/or infrared spectral range and/or is excitable to fluorescence and/or phosphorescence in these spectral ranges.

Therefore, additional items of information or security features can be integrated into the molded body, which optionally are not recognizable to the human eye or only become visible under corresponding illumination. This is also particularly suitable for the integration of machine-readable security features into the molded body.

Alternatively or additionally, the plastic molding compound can at least regionally comprise substances and/or particles, which are detectable by machine, in particular magnetically.

It is furthermore advantageous if the molded body is subjected to a surface treatment after the application of the plastic molding compound.

Such a surface treatment preferably comprises a solvent treatment and/or an at least partial coating, in particular wet lacquering and/or the application of a transfer foil, of the molded body.

Therefore, a particularly appealing surface design can be achieved. In particular, roughness of the surface, which necessarily arises during the three-dimensional printing, can be compensated for by a solvent treatment or a coating. Furthermore, further decorative elements or protective lacquers can thus be applied. In this case, in particular acetone (propanone or dimethyl ketone), in the case of ABS, and dichloromethane or dichloroethane, in the case of PC, are particularly suitable as solvents for a solvent treatment.

BRIEF DESCRIPTION OF THE DRAWINGS

The invention will now be explained in greater detail on the basis of exemplary embodiments. In the figures.

DETAILED DESCRIPTION OF THE INVENTION

Figure 1:
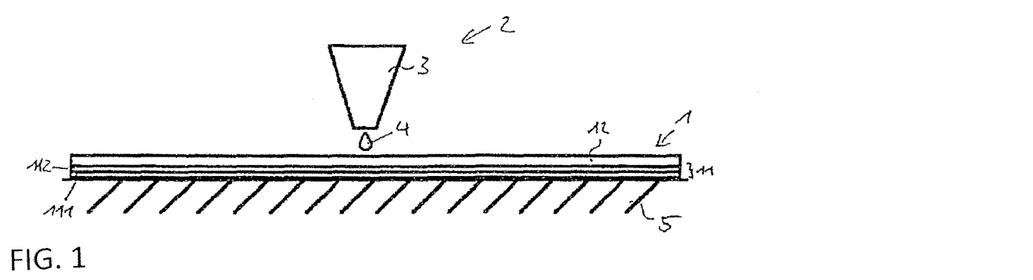
FIG. 1 shows a schematic sectional illustration through an exemplary embodiment of a molded body.

A molded body 1 comprises a foil ply 11, to which a plastic molding compound 12 is applied by means of a three-dimensional printing method.

The foil ply 11 can be a lamination foil or a transfer foil in this case. In the latter case, the foil ply 11 comprises a carrier ply 111, on which the transfer ply 112, which finally remains in the molded body, is attached so it is detachable.

A layer thickness of the foil ply 11 is preferably 10 µm to 250 µm, particularly preferably 20 µm to 250 µm.

The foil ply 11 can have an adhesion-promoter layer, which is not shown in the figures. The plastic molding compound 12 is then applied to this adhesion-promoter layer. It can be a plastic which is chemically related to the plastic molding compound in this case and/or a heat-activatable adhesive, for example, adhesive based on polyvinyl chloride (PVC) or based on acrylics or adhesive based on mixtures of PVC and acrylics.

Furthermore, the foil ply can comprise decorative or functional layers or also combinations thereof, which can be provided over the entire surface or also partially.

Examples of decorative layers are a layer having at least one colorant, pigment, a pigment excitable in the visible and/or infrared or ultraviolet spectral range to fluorescence and/or luminescence, an optically variable pigment, a liquid crystal layer, a cholesterol liquid crystal layer, a metal layer, a layer having a relief structure, in particular a diffractive lattice structure, a hologram, a matte structure, a layer having a microoptical structure, in particular a microlens and/or microprism arrangement, a layer made of a textile material, a leather, an artificial leather, or a wood veneer.

The functional layers can be protective layers to protect from mechanically and/or thermally and/or chemically external influences and/or magnetic and/or magnetizable layers.

Electrical or electronic layers, in particular layers comprising conductor track structures, antenna structures, electrical or electronic components, sensors, inductive or capacitive touch sensors, chips, display elements, in particular LED, OLED, or LCD display elements, can also be used.

The foil ply 11 can furthermore have a tactilely perceptible surface relief, in particular having a predefined roughness and/or having an item of predefined tactilely perceptible information, preferably in Braille script. The tactilely perceptible surface relief can in particular also be embodied so that a special material impression is generated, which otherwise cannot be provided by the plastic molding compound. For example, this can be a velvety, so-called soft touch impression of the surface.

The plastic molding compound 12 is preferably a thermoplastic plastic, in particular acrylonitrile-butadiene-styrene copolymer (ABS), polycarbonate (PC), or ABS-PC.

It is also possible in this case that the plastic molding compound 12 consists of multiple, in particular different-colored plastics, at least one of which is preferably transparent.

In this manner, further design and/or security elements can be integrated into the molded body 1, which can be independent of the foil ply 11 or can supplement it to form an overall design.

The design and/or security elements created in the molded body 1 in this manner do not have to be planar in this case. It is possible due to the three-dimensional printing that they also extend in three dimensions. This substantially increases the counterfeiting security of the molded body 1.

Possible design and/or security elements in this case are alphanumeric characters, symbols, logos, geometric patterns, in particular guilloche patterns, pixel images, and/or items of personalization information. Manifold patterns which complement each other are also possible. Interference effects and the like can thus be generated, for example.

At least one of the different-colored plastics preferably comprises a colorant, a pigment, nanoparticles, an optically variable pigment, a thermochromic or photochromic substance, to thus create the desired color effect.

Colorants or pigments which are detectable in the ultraviolet, visual, or infrared spectral range and/or are excitable to fluorescence and/or phosphorescence in these spectral ranges can thus also be introduced in defined patterns into the plastic molding compound 12. Magnetic or magnetizable particles can also be introduced into the plastic molding compound 12, to provide security features which are detectable by machine.

The molded body 1 can furthermore also be provided with further surface coatings, for example, wet lacquers or further transfer foils.

To produce the molded body 1, the plastic molding compound 12 is applied by means of a print head 3 of a three-dimensional printer 2 in the form of individual drops 4 to the foil ply 11.

Additive 3D printing is typically performed using thermoplastic plastic material, which is melted and is printed drop-by-drop to form a layer in the liquid state by means of heated nozzles. In this case, the plastic is heated only slightly above its melting temperature, so that the plastic solidifies immediately after incidence on the respective substrate and in particular cannot run. A high level of printing resolution can thus be achieved, which is determined above all by the construction of the nozzles of the print head 3.

In this manner, the printed plastic drops 4 bond to the foil ply 11 located underneath to form a unit, if it is an already provided layer of the molded body 1 to be formed. For example, acrylonitrile-butadiene-styrene copolymer (ABS), polycarbonate (PC), and ABS-PC are suitable as the plastics.

If the substrate of the 3D body is now formed by the transfer ply 112 of a transfer foil 11, the plastic drops 4 thus bond to the uppermost layer of the transfer ply 112.

It is advantageous in this case if this uppermost layer is or comprises an adhesion-promoter layer, which preferably consists of the same plastic material as the plastic drops. Chemically similar plastic or polymer materials are also usable, if the adhesion between plastic drops and the uppermost layer of the transfer ply is sufficiently great.

Alternatively or additionally, the plastic can also be applied in the form of strands or threads to the foil ply 11.

Alternatively or additionally to the thermoplastic bonding, a bond is also possible between the plastic and the foil ply via chemical-reactive operations between the two materials.

The substrate 5, on which the foil ply 11 during the manufacturing and indirectly also the molded body 1 rest, is preferably as smooth as possible, preferably polished to a high gloss and as dust-free as possible. A smoothest possible external surface of the molded body 1 having the applied foil ply 11 can thus be achieved.

Known 3D printing methods have a resolution of approximately 100 µm to 500 µm. This generates surface roughness and staircase effects, which are in the range of this resolution, in particular on inclined surfaces of the molded body 1.

It is therefore preferable if the foil ply 11 has a thickness and composition to at least partially compensate for this surface roughness so that only a very slight surface roughness of the molded body 1 is present on the later external surface of the molded body 1 having the adhering transfer ply. In particular, the adhesion-promoter layer is preferably approximately 5 µm to 50 µm thick.

If a transfer foil is used as the foil ply 11, it is arranged so that the carrier foil 111 is arranged on the side of the transfer ply 112 facing away from the molded body 1, and the exposed uppermost layer of the transfer ply 112 faces toward the molded body 1.

To increase the adhesion of the plastic drops 4 on the foil ply 11, it is advantageous to heat the foil ply 11 to a temperature which is just below the melting temperature of the plastic drops 4. The cooling of the plastic drops 4 on the foil ply 11 therefore takes place slowly, which improves the bonding of the two plastics.

The foil ply 11 can be fastened by means of vacuum suction and/or mechanical means on the substrate 5, so that slipping and/or warping of the foil ply 11 during the 3D printing can be reduced or prevented entirely.

Figure 2:
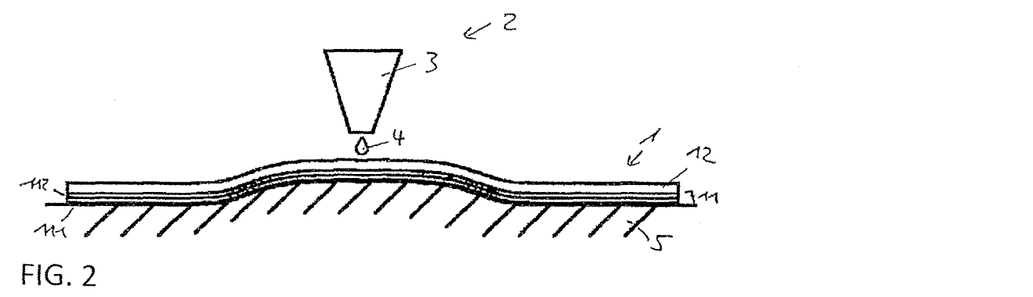
FIG. 2 shows a schematic sectional illustration through an alternative exemplary embodiment of a molded body having curved base.

The transfer foil can be arranged on a level substrate 5, wherein the best known and widespread 3D printing devices can be used. However, the foil ply 11 can also be arranged, as shown in FIG. 2, on a two-dimensional or three-dimensional formed substrate 5, for example, on a convexly and/or concavely curved substrate 5.

In this case, this curved substrate 5 can also correspond in particular to the two adjacent external faces of the molded body 1, whereby the foil ply 11 would be applied later to these two adjacent external faces of the molded body 1. It is particularly advantageous in this case if the foil ply 11 is preheated and fixed by means of vacuum suctioning on this substrate 5.

The print head 3 can preferably be moved by a robot arm in all degrees of freedom in this case.

Figure 3:
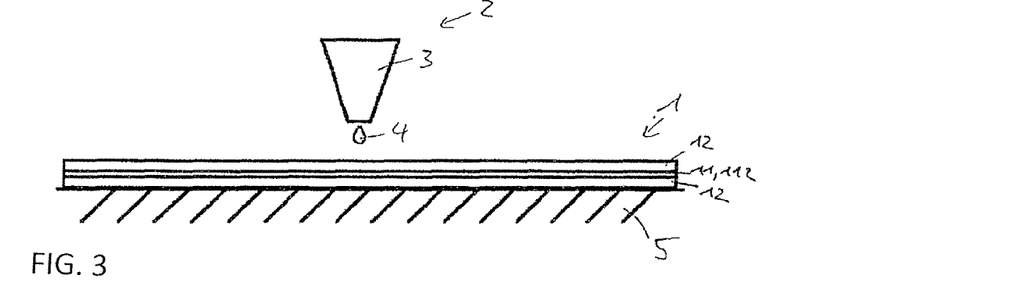
FIG. 3 shows a schematic sectional illustration through an alternative exemplary embodiment of a molded body having foil ply which is plastic coated on both sides.

If the molded body 1 has been constructed in the desired manner on the foil ply 11, it is possible in one embodiment of the invention to use the molded body 1 such that the previous lower side, which is now coated with the transfer ply 112 of the foil ply 11, forms an upper side of the molded body 1. This is shown in FIG. 3.

The carrier ply 111 of the foil ply 11 can now be pulled off. It is then possible to continue the construction of the molded body 1 on the now exposed layer of the transfer ply 112.

For this purpose, it is again advantageous if this outermost layer of the transfer ply 112 consists of the same plastic material or a chemically similar plastic or polymer material, so that the adhesion between the transfer ply 112 and the layer of the molded body 1 resting directly thereon is sufficiently strong.

The transfer ply 112 of the transfer foil 11 can thus be embedded inside the molded body 1 and thus, alternatively to the purpose of surface coating, can now form an internal decorative layer or layer formation and/or an internal functional layer or layer formation of the molded body 1.

For example, a transparent, translucent, or opaque protective layer, which is implemented comparatively thin in particular, can be applied to the transfer ply 112, for example, to increase the chemical and/or thermal and/or mechanical resistance of the transfer ply 112.

This protective layer can also receive a surface structuring in this case, for example, a tactilely perceptible structure, for example, having a desired roughness, relief structure, or a desired coding, in particular as Braille script.

The finished molded body 1 can subsequently be provided with a further surface treatment and/or surface coating, similarly to other known plastic bodies.

For example, the still existing surface roughness can be reduced in a solvent bath. This is advisable above all if, on the one hand, the foil ply 11 is embedded in the molded body 1 and is not exposed on the surface and, on the other hand, subsequently a further surface coating is provided using a further transfer foil and/or by means of wet lacquering.

In this case, a further surface coating using a further transfer foil can be advantageous to achieve optical and/or functional combinations or interactions between the two transfer foil coatings.

For example, a superposition of two fine optical structures can create a moiré effect. For this purpose, the first applied foil ply 11 can have fine optical lattice structures or a microimage grid or the like. The second transfer foil can also have fine optical lattice structures or a microlens pattern. Alternatively thereto, the microlens pattern could also be printed as a transparent layer of the molded body 1 on the first applied foil ply 11.

However, the further surface coating can also be used for the purpose of achieving an electrical functionality with the first applied foil ply 11. For example, two electrically conductive layers of the first and further transfer plies can be superimposed so that inductive and/or capacitive interactions result. For example, this can be used to implement a two-ply touch element or a two-ply antenna.

One possible application of such a molded body 1 is an ID card made of plastic. The transfer ply 112 of the transfer foil 11 is intended to provide the function of a security element, for example, a KINEGRAM®, in this case. The transfer ply 112 can cover the entire surface of the ID card or only a partial region in this case. This means that the lower side of the molded body 1 to be coated using the transfer ply 112 later represents the upper side or visible side of the molded body 1.

The personalized items of information which are to be represented on the card are introduced directly by means of different-colored plastics during the 3D printing. The items of personalized information are thus fed into the data processing unit of the 3D printer and are integrated therein into the data of the virtual 3D data model of the molded body 1.

For example, three colors can be provided: a first color for the background, for example, white or light gray; a second color for a security print, for example, green or blue for a guilloche pattern; a third color for the items of personalized information, for example, black. The items of personalized information can be in this case letters, numbers, symbols, or also graphics or a pixel image, in particular a grid image or halftone image.

The items of personalized information can be printed in this case so that they are not only superficially present, but rather are present in multiple or in particular in all layers of the 3D body. Counterfeiting of these items of information is thus made much more difficult.

The plastic preferably has special pigments for at least one of the colors, which have machine-readable properties and/or are pigments or additives which are only visible under UV light or IR light. An additional and easily checkable authenticity feature is thus integrated.

It is also possible to incorporate a data memory similar to a magnetic strip into the 3D body using an additionally incorporated plastic having magnetic particles.

The last outermost layer of the molded body 1 can additionally represent the items of personalized information as a surface relief. These can either be the same items of information or alternatively or additionally in another coding, for example, as Braille script.

The visible side of the molded body 1 provided with the security element can, after manufacturing of the molded body 1 as described above, also additionally be coated with a further, in particular transparent protective layer by means of 3D printing.

This protective layer can also contain a surface relief, in particular precisely in register with the already introduced items of personalized information. If the items of personalized information have a pixel image, for example, a grid image, the surface relief can also contain this grid image as a tactilely perceptible relief.

A further exemplary application would be, similarly to the ID card, to provide 3D-printed replacement parts, for example, for machines, having a counterfeit-proof feature of a transfer foil 11, to be able to differentiate counterfeit printed replacement parts from authentic printed replacement parts.

A further possible application is in the field of injection molding. The problem exists therein that due to the high pressures and temperatures occurring therein, some sensitive components can only be used with great effort or not at all. In particular, the back injection of electronics or other types of sensitive layers (for example, thermochromic materials, sensitive surface structures, or soft materials) is only possible to a limited extent.

If such a sensitive component is provided as a transfer foil 11, for example, having a transfer ply 112 comprising conductor tracks and/or electronic components and/or thermally and/or mechanically sensitive layers, it is possible to apply a protective layer to this foil 11 by means of 3D printing.

This layer can be used as a mechanical protective layer, but alternatively or additionally also as a thermally insulating layer, if subsequently the intermediate product made of transfer foil and 3D printed layer is back injected in a following work step. An insert for an injection molding method is thus produced by means of 3D printing, without this insert previously having to be produced by means of methods which have a thermally and/or mechanically stressing effect on the sensitive components.

Of course, subsequent injection molding can also be omitted and the entire part can be carefully produced using 3D printing.

Finally, FIGS. 4A to 4D schematically show a possibility for manufacturing a plastic molding compound 12 from different-colored plastics in three-dimensional printing.

Figure 4A:
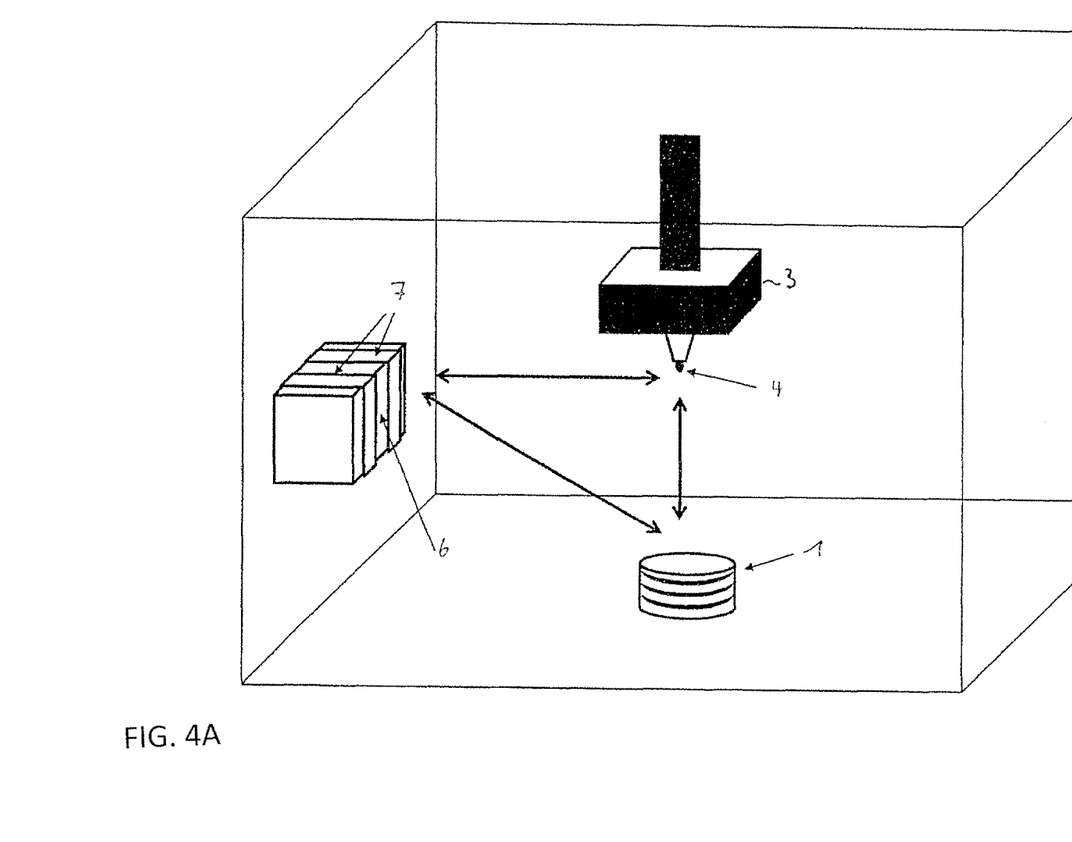
FIGS. 4A-4D show a schematic illustration of the manufacturing of a molded body using a multicolored plastic molding compound.
Figure 4B:
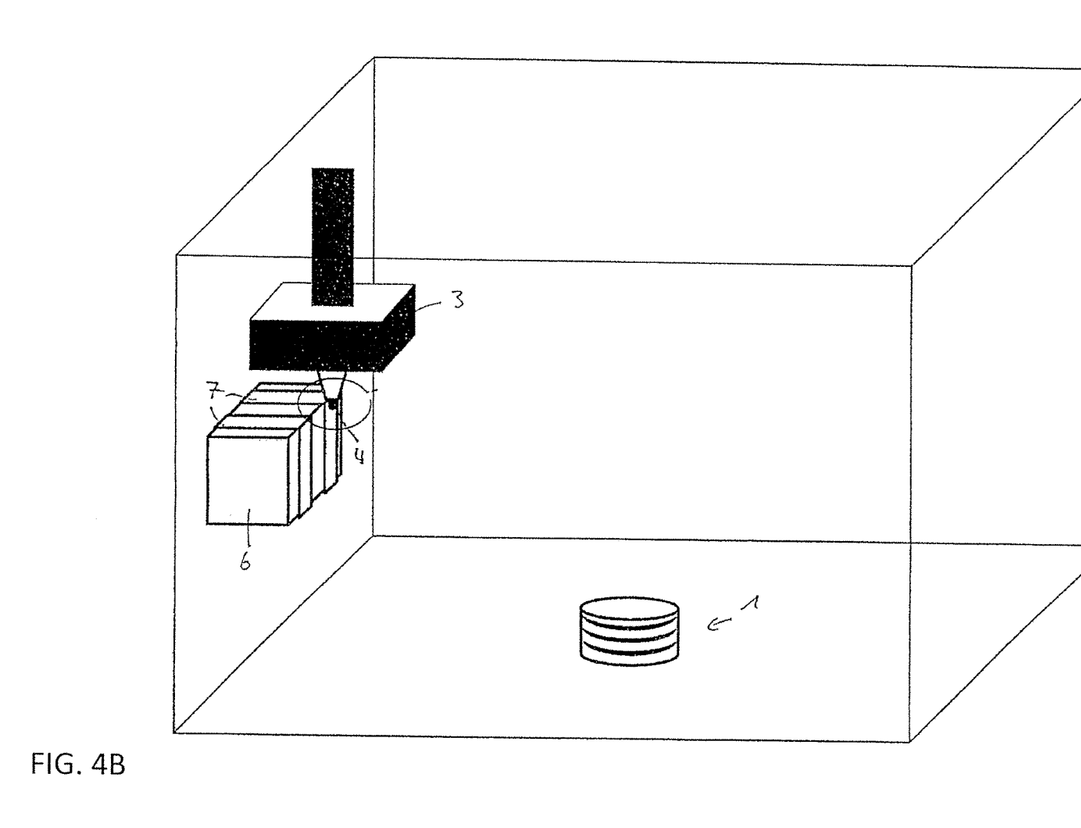

For this purpose, the print head 3 first produces a plastic drop 4, which is not yet detached from the print head, however. The print head 3 now approaches, as shown in FIG. 4B, a heating device 6, on which foils 7, which are different-colored or are provided with different particles, are arranged. Depending on the desired admixture with the plastic drop 4, the print head 3 now brings the plastic drop 4 into contact with the corresponding foil, without the plastic drop 4 detaching from the print head 3.

The colorants or particles are therefore removed from the foil 7 and adhere to the plastic drop 4 and/or dissolve in the plastic.

Figure 4C:
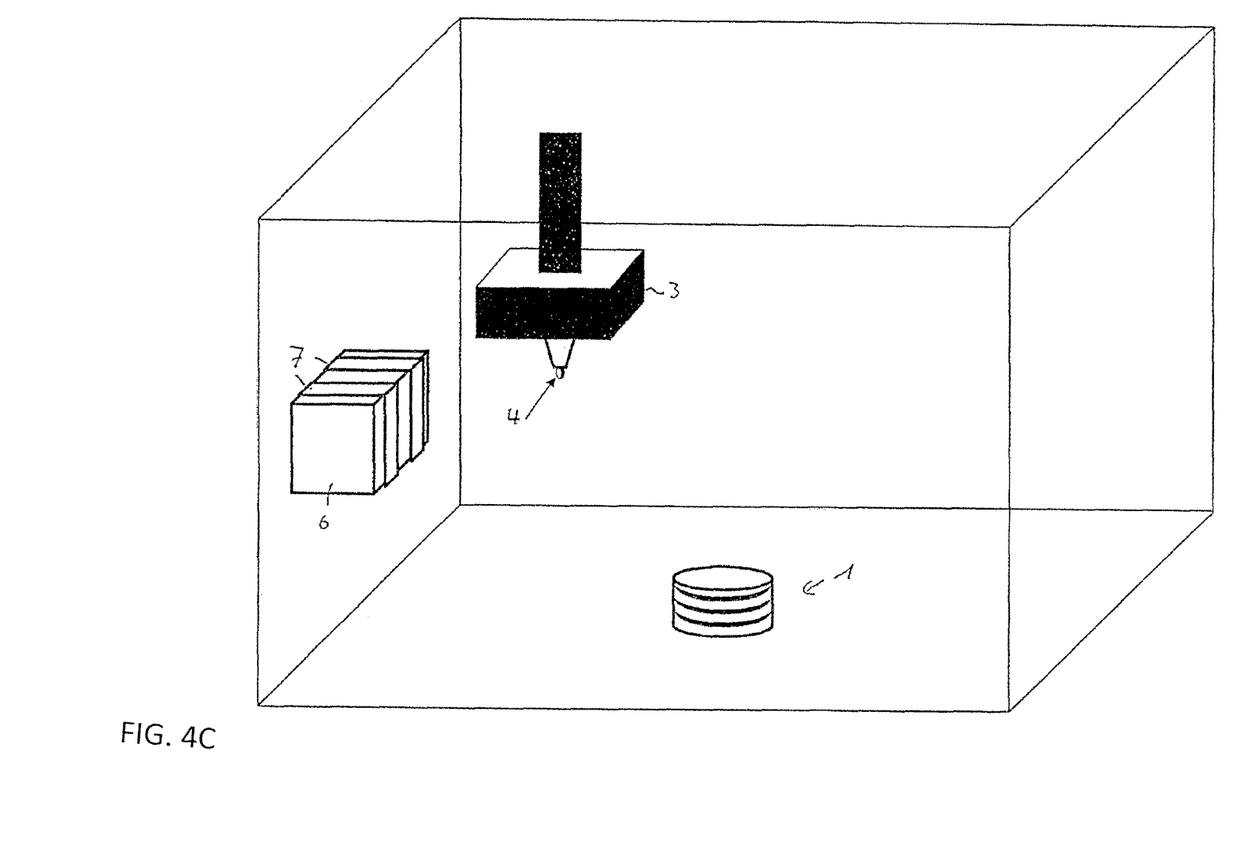
Figure 4D:
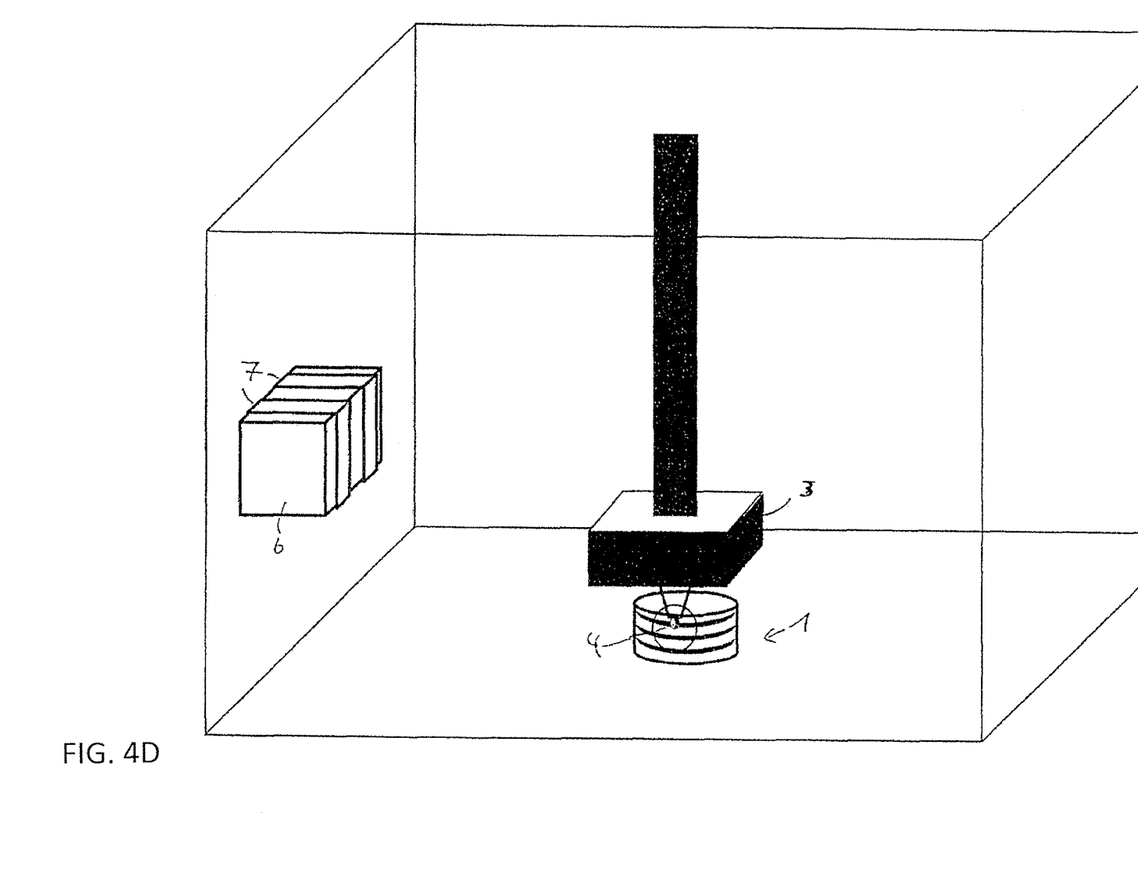

As shown in FIG. 4C, the print head 3 now removes the plastic drop 4 from the foil 7 again. The print head 3 subsequently approaches the molded body 1 and deposits the plastic drop 4 at the desired point on the molded body 1 (FIG. 4D).

It is therefore possible, after the melting of the plastic material, but before the printing or depositing of the plastic material on/at the molded body 1, to modify the plastic material in its properties and thus introduce modified plastic material in a targeted manner into the molded body 1. For example, by means of metal components absorbed using the plastic drop 4 from the foil 7, an electrically conductive conductor track can be printed piece-by-piece within the molded body or on the surface of the molded body 1 or other elements, which otherwise cannot be integrated into the molded body 1, can be introduced/applied into the interior and/or onto the exterior of the molded body 1, respectively. For example, these can be non-meltable materials such as crystals or special semiconductors.

A method for three-dimensional printing of a molded body is particularly preferred, which is distinguished in that
during the three-dimensional printing, a predefined quantity of a plastic molding compound is melted in a print head, is brought into contact in the molten state with at least one additive, and, after absorbing the at least one additive, is deposited by means of the print head at a predefined position.

An exemplary embodiment of such a method is described above on the basis of FIG. 4A to FIG. 4D, for example.

The method is optionally distinguished by one or more of the following features:
the at least one additive is provided in the form of a foil and/or on a carrier foil;
the at least one additive is heated by means of a heating device to a predefined temperature;
the at least one additive is a colorant, a pigment, nanoparticles, an optically variable pigment, a thermochromic or photochromic substance, a colorant or a pigment which is detectable in the ultraviolet, visible, or infrared spectral range and/or is excitable to fluorescence and/or phosphorescence in these spectral ranges, a metal, a semiconductor, and/or a crystalline material;
a decorative or functional structure, in particular an item of optical information, an electrical or electronic structure, in particular a conductor track structure and/or an antenna structure, is implemented in the molded body by the at least one additive.

Such a method can be used in combination with the above-described methods, in particular on the basis of FIG. 1 to FIG. 3, for producing a molded body by three-dimensional printing on a foil and the features described therein, or also independently thereof.

LIST OF REFERENCE NUMERALS 1 molded part
11 foil ply
111 carrier layer
112 transfer ply
12 plastic molding compound
2 three-dimensional printer
3 print head
4 plastic drop
5 substrate
6 heating device
7 foil

The invention claimed is:
1. A method for producing a molded body comprising:
a) providing a foil ply, wherein the foil ply is a transfer foil comprising a transfer ply and a carrier layer detachably attached thereto;
b) applying a plastic molding compound in a predefined three-dimensional shape onto the transfer ply of the foil by means of a three-dimensional printing method; and
c) detaching the carrier layer from a transfer layer of the transfer ply whereby the transfer ply finally remains in the molded body.

2. A method according to claim 1, wherein a foil ply is used, which has an adhesion-promoter layer, onto which the plastic molding compound is applied in step b).

3. A method according to claim 2, wherein a foil ply is used, the adhesion-promoter layer of which consists of the same plastic material as the plastic molding compound applied in step b).

4. A method according to claim 2, wherein a foil ply is used, the adhesion-promoter layer of which has a heat-activatable adhesive.

5. A method according to claim 2, wherein a foil ply is used, the adhesion-promoter layer of which has a layer thickness of 0.01 µm to 50 µm.

6. A method according to claim 1, wherein a foil ply is used, which has at least one decorative layer.

7. A method according to claim 6, wherein a foil ply is used, the at least one decorative layer of which is or comprises one of the following layers or a combination thereof: a layer having at least one colorant, pigment, a pigment excitable in the visible, infrared, or ultraviolet spectral range to fluorescence and/or luminescence, an optically variable pigment, a liquid crystal layer, a cholesterol liquid crystal layer, a metal layer, a layer having a diffractive lattice structure, a hologram, a matte structure, a layer having a microlens and/or microprism arrangement, a layer made of a textile material, a leather, an artificial leather, or a wood veneer.

8. A method according to claim 1, wherein a foil ply is used, which has at least one functional layer.

9. A method according to claim 8, wherein the at least one functional layer is or comprises a layer comprising conductor track structures, antenna structures, electrical or electronic components, sensors, inductive or capacitive touch sensors, chips, OLED or LCD display elements.

10. A method according to claim 8, wherein the plastic molding compound is applied so that it only partially covers the at least one functional layer.

11. A method according to claim 1, wherein a foil ply is used, which comprises a tactilely perceptible surface relief having a predefined roughness and/or having a predefined item of tactilely perceptible information.

12. A method according to claim 1, wherein the plastic molding compound is applied by means of a 3D print head, which is guided robotically.

13. A method according to claim 1, wherein the plastic molding compound is applied in the form of drops and/or strands and/or threads.

14. A method according to claim 1, wherein ABS, polycarbonate, or ABS-PC, is used as the plastic molding compound.

15. A method according to claim 1, wherein, before the application of the plastic molding compound, the foil ply is fixed on a support element having a predefined surface geometry by means of mechanical clamping means and/or by vacuum fixation.

16. A method according to claim 1, wherein, before the application of the plastic molding compound, the foil ply is heated to a temperature of approximately 30° C. to approximately 150° C.

17. A method according to claim 1, wherein, during the application of the plastic molding compound, a plurality of plastics having different optical properties is applied, wherein the 3D print head is guided so that an item of visually perceptible information is represented by the plastics.

18. A method according to claim 1, wherein the molded body is subjected to a surface treatment after the application of the plastic molding compound.

19. A method according to claim 18, wherein the surface treatment comprises a solvent treatment and/or at least partial coating, wet lacquering and/or the application of a transfer foil, of the molded body.

20. A method for producing a molded body comprising:
a) providing a foil ply; and
b) applying a plastic molding compound in a predefined three-dimensional shape onto the foil ply by means of a three-dimensional printing method,
wherein, after the application of the plastic molding compound in step b), a further plastic molding compound is applied in a predefined three-dimensional shape to the side of the foil ply facing away from the plastic molding compound applied in step b) by means of a three-dimensional printing method.

21. A method according to claim 20, wherein a hot stamping foil, which has a transfer ply and a carrier layer detachable therefrom, is used as the foil ply, wherein the plastic molding compound is applied in step b) to the transfer ply.

22. A method for producing a molded body comprising:
a) providing a foil ply having at least one decorative layer; and
b) applying a plastic molding compound in a predefined three-dimensional shape onto the foil ply by means of a three-dimensional printing method,
wherein the foil ply forms a decorative surface of the molded body.

23. A method for producing a molded body comprising:
a) providing a foil ply having at least one functional layer and a carrier layer detachably attached to the functional layer, the functional layer comprising an electrical or electronic layer;
b) applying a plastic molding compound in a predefined three-dimensional shape onto the foil ply by means of a three-dimensional printing method; and
c) detaching the carrier layer from the functional layer whereby the functional layer finally remains in the molded body.

24. A method for producing a molded body comprising:
a) providing a foil ply having an adhesion-promotion layer and a carrier layer, the adhesion-promotion layer comprising a plastic material;
b) applying a plastic molding compound in a predefined three-dimensional shape onto the adhesion-promotion layer of the foil ply by means of a three-dimensional printing method, wherein the plastic material of the adhesion-promotion layer is the same as the plastic molding compound; and
c) detaching the carrier layer from the adhesion-promotion layer whereby the adhesion-promotion layer finally remains in the molded body.

25. A method for producing a molded body comprising:
a) providing a foil ply;
b) applying a plastic molding compound in a predefined three-dimensional shape onto the foil ply by means of a three-dimensional printing method,
wherein the three-dimensional printing comprises:
melting a predefined quantity of a plastic molding compound in a print head;
bringing the melted predefined quantity of the plastic molding compound into contact in the molten state with at least one additive;
absorbing the at least one additive into the melted predefined quantity of the plastic molding compound; and depositing the melted predefined quantity of the plastic molding compound with the absorbed additive at a predefined position on the foil ply with the print head.

\* \* \* \* \*